United States Patent [19]
Schwarz

[11] Patent Number: 5,019,837
[45] Date of Patent: May 28, 1991

[54] STABLE MIRROR MOUNT ASSEMBLY FOR AN OPTICAL SCANNING SYSTEM

[75] Inventor: Gary S. Schwarz, Ontario, N.Y.
[73] Assignee: Xerox Corporation, Stamford, Conn.
[21] Appl. No.: 419,247
[22] Filed: Oct. 10, 1989
[51] Int. Cl.$^5$ ............................................. H04N 1/21
[52] U.S. Cl. ............................... 346/108; 346/139 R
[58] Field of Search ............. 346/108, 107 R, 76 L, 346/160, 139 R

[56] References Cited
U.S. PATENT DOCUMENTS 4,230,902 10/1980 Hug et al. ..................... 346/76 L
4,351,005 9/1982 Imai et al. ..................... 346/109

Primary Examiner—Mark J. Reinhart

[57] ABSTRACT

A mirror mounting structure with low thermal drift is enabled by providing a mirror mounting structure which vertically and/or horizontally aligns the mirror by providing two point forces against the mirror holding structure. The mirror holding arm is connected to a thick more rigid arm by resilient narrow slightly flexible neck portion. Screws threaded through the large arm contact alignment points on the mirror mount portion and permit accurate alignment in a desired plane. Thermal drift and hysteresis is minimized, since the alignment forces are acting upon the mirror mount portion in the same direction and minimize the deviations caused by thermal expansion.

3 Claims, 3 Drawing Sheets

STABLE MIRROR MOUNT ASSEMBLY FOR AN OPTICAL SCANNING SYSTEM

BACKGROUND AND INFORMATION DISCLOSURE STATEMENT

The present invention is generally directed toward an improved rigid mounting for a mirror or plurality of mirrors which are used in a scanning optical system, and more particularly, to a mirror structure design which is especially useful in a laser printing system.

Printing system utilizing lasers to reproduce information are well known in the art. Typically, the system includes a laser for generating a laser beam, a modulator, such as an acousto-optic modulator, for modulating the laser beam in accordance with input information to be reproduced, a multi-faceted scanner for scanning the modulated laser beam across a medium on a line to line basis, and various optical components to focus and align the laser beam onto the medium. The Xerox 4045 printer is an example of this type of printing system.

A compact design for the scanning optics of these prior art type of printers is desirable to make the machine itself as compact as possible. The scanning system is usually reduced in total area by folding the beam path by the use of a plurality of mirrors. An example of a compact modular laser printing system is shown in U.S. Pat. No. 4,230,902. As shown in FIGS. 2 and 3 of that patent, the output laser beam 60 is directed through modulator 62 and folded by mirrors 62, 64, and 66. The aligning of these mirrors is a critical factor in the performance of the scan system, since any deviation from the required angular orientation would result in nonuniformity at the scanned raster lines of the recording medium. The mounting structure for these mirrors was not disclosed in the '902 patent, but FIG. 1 of the present application shows a typical prior art mounting structure for mirrors mounted in a raster output scan (ROS) printing system. A mirror 10 is mounted in a recess shelf portion of a first, relatively narrow arm 12. Arm 12 has a wider area 14 having a threaded aperture 16 therethrough. Arm 12 is connected to, a base portion 18 which is fixedly secured to the ROS housing. A relatively thick, upwardly extending arm 20 is also connected to and extends upwardly from, base assembly 18. Arm 20 has two apertures bored therethrough. Aperture 22 accommodates a bolt 26 having a threaded end which screws into threaded aperture 16. Set screw 28 is inserted through threaded aperture 24 until it comes into contact with arm 12. Vertical alignment of mirror 10 is accomplished by essentially providing two forces to arm 12. Arm 12 is of a material, (typically aluminum or steel) and thin enough to have a small degree of flexibility. A first "pull" force is applied via bolt 26 seated in aperture 27 through threaded aperture 16 which "pulls" arm 12 in the direction of arrow A. A second "push" force is applied by turning screw 28 so that it applies a force represented by arrow B against arm 12. In the usual alignment, screw 28 is turned ½ turn past the desired alignment point and the arm is pulled into arrow A's direction by means of the "pull" bolt 26.

One problem with this prior art design is that of mirror "thermal drifting" because of temperature changes. The metal structure of the mirror mounting assembly is subject to a slight degree of thermal expansion and contraction with temperature. The opposing forces (A and B) at different points of the arm holding the mirror create an inherently unequal stress within that mirror mounting assembly. During temperature changes, the original moment established by the two opposing forces aligning the mirror in the desired plane is slightly changed causing a mirror orientation "shift". This shift, or thermal drift results in beam deflection paths which deviates from the desired path. As a practical matter, this shift creates a mirror misalignment under two conditions. The first can be characterized as a thermal drift error due to the effects of hysteresis. For example, a ROS unit having multiple mirror structures may be aligned to the required precision at an ambient temperature at a test facility. The unit would then be shipped to the facility where it is to be operated. If the unit experiences temperature variations during transit, the mirror structure will undergo a permanent change in orientation when returned to the ambient temperature due to the effects of hysteresis. The second condition is the thermal drift actually experienced during temperature changes when being operated. A one, or two, or three mirror system may be tolerant enough to absorb a slight degree of thermal drift, but systems with 4, 5 or event 6 mirrors (such as the ROS unit used in the Xerox 8836 printer) cannot tolerate the amount of cumulative thermal drift resulting from the present mirror mounting designs.

The present invention is, therefore, directed toward an improved mirror mounting design which reduces the effects of thermal drift and hysteresis on the mirrors used in a ROS-type printing system. More particularly, the invention is directed towards a mirror mounting assembly comprising a mounting structure having a base area adapted to be secured to a fixed location, said base area having a relatively thicker arm portion projecting away therefrom, said arm portion connected to a mirror mount portion at its upper end by a relatively narrow, slightly flexible neck portion, and means for applying a pushing force against at least two vertical points of said mirror mount portion.

DESCRIPTION OF THE INVENTION

Figure 2:
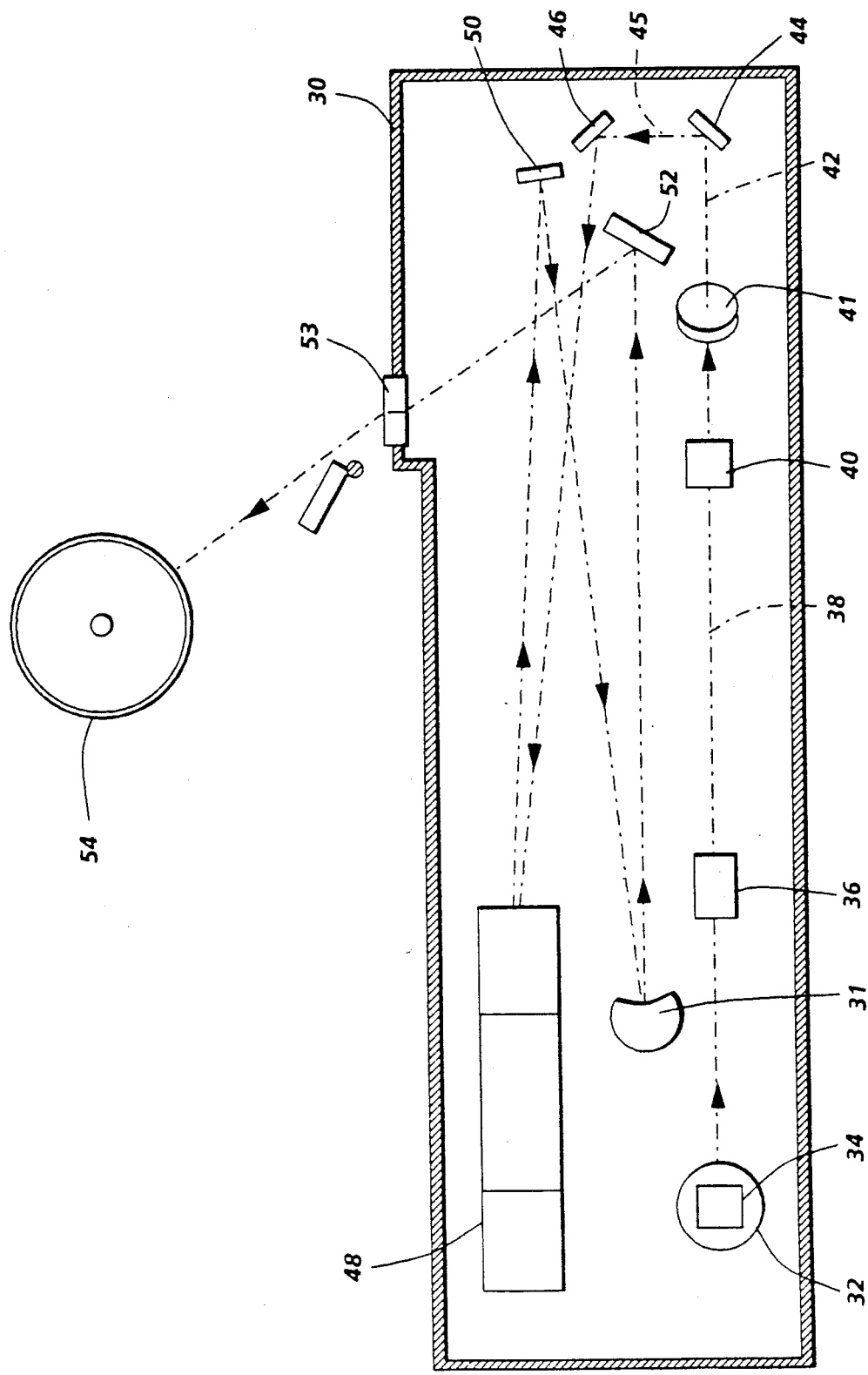
FIG. 2 shows a compact ROS scanning assembly using a total of six mirrors.

FIG. 2 illustrates a compact modular housing 30 which contains the components used to form an output image at a recording medium. A laser 32 generates a collimated beam of monochromatic light. The monochromatic light beam is reflected by first mirror 34 onto modulator 36, the light beam being modulated in conformance with the information contained in a video signal. Modulator 36 may be any suitable acousto-optic or electro-optical modulator for recording the video information in the form of a modulated light beam at the output of the modulator. By means of the modulator the information within the video signal is represented by the modulated light beam 38. Light beam 38 is reflected by second mirror 40 and is incident on imaging lens 41. Imaging lens 41 produces a beam 42 which is reflected by third and fourth mirrors 44 and 46, and impinges upon a plurality of contiguous facets of scanning polygon 48, as shown.

The beams reflected from polygon 48 are reflected by fifth and sixth mirrors 50, 52 and are directed through post-polygon conditioning lenses (not shown) and then through window 53 to form output raster lines at photoreceptor 54.

Figure 1:
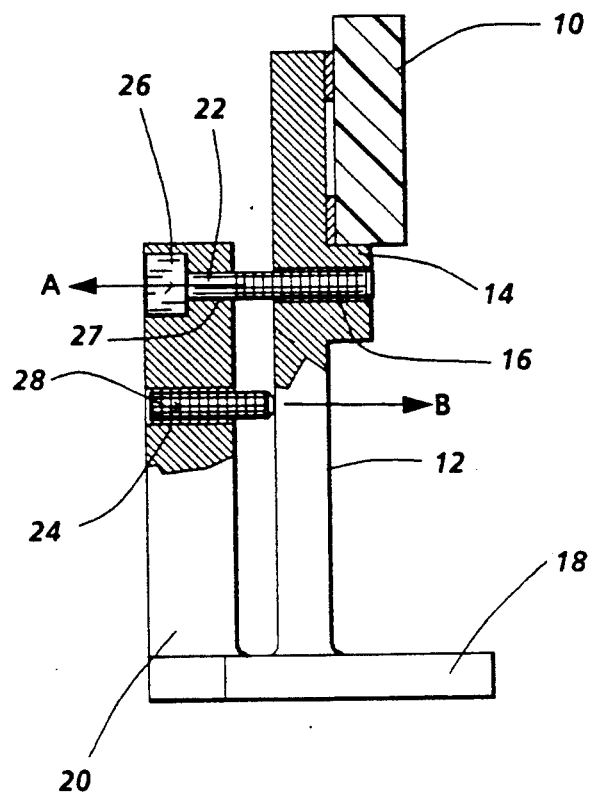
FIG. 1 shows a prior art mirror mounting structure.
Figure 3A:
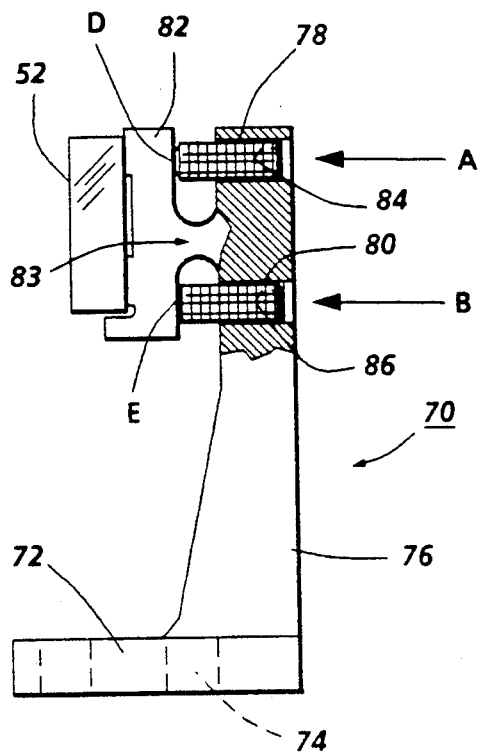
FIGS. 3A and 3B are side and front views, respectively, of a mirror mount structure according to the present invention.
Figure 3B:
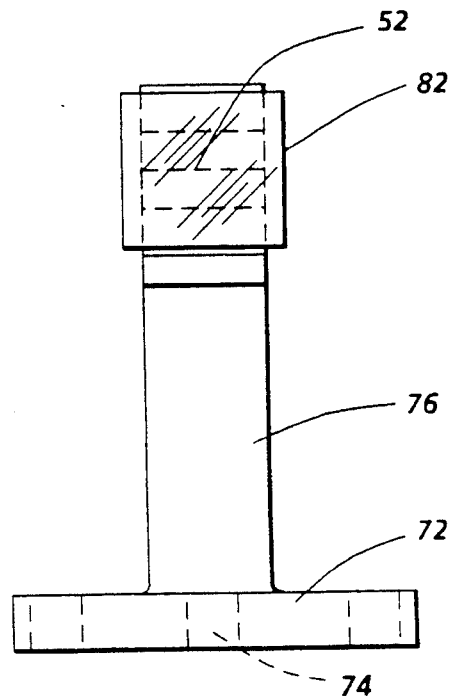

Mirrors 34, 40, 44, 46, 50, and 52, are fixed in place by an improved mounting structure according to the principles of the present invention. FIGS 3A, 3B show mirror 50 mounted in place on a mirror mounting structure 70. The other mirrors are mounted in a similar fashion. Structure 70 comprises a base portion 72 which is secured to the housing by a plurality of screws 74. The upper end consists of a first, relatively thick portion 76 having threaded apertures 78, 80 therethrough. Mirror mount portion 82, which holds mirror 50 in a secure position, is connected to portion 76 by a relatively narrow, slightly flexible neck portion 83. Set screws 84, 86 extend through apertures 78, 80 and make butting contact at points D,E on the surface of mount portion 82. During testing and set-up procedures, mirror 50 and other mirrors in the system which are similarly aligned, are adjusted in the vertical plane by set screws 84, 86 which both apply a "push" force at points D and E. Because of the slight flex provided by neck portion 82, the mirror can achieve very accurate alignment with this design. With this design both forces exerted by the screws 84, 86 are applied in the same direction shown by the arrows A and B rather than in two opposing directions ("pull" "push" of the prior art). Therefore, with temperature variation, the mirror holding structure will not be subject to the unequal tension variations caused by the "pull" "push" alignment forces of the prior art, and thermal drift is held at a decreased level. This conclusion is supported by testing a prior art mirror structure of the type shown in FIG. 1 with the design of the present invention.

Figure 4:
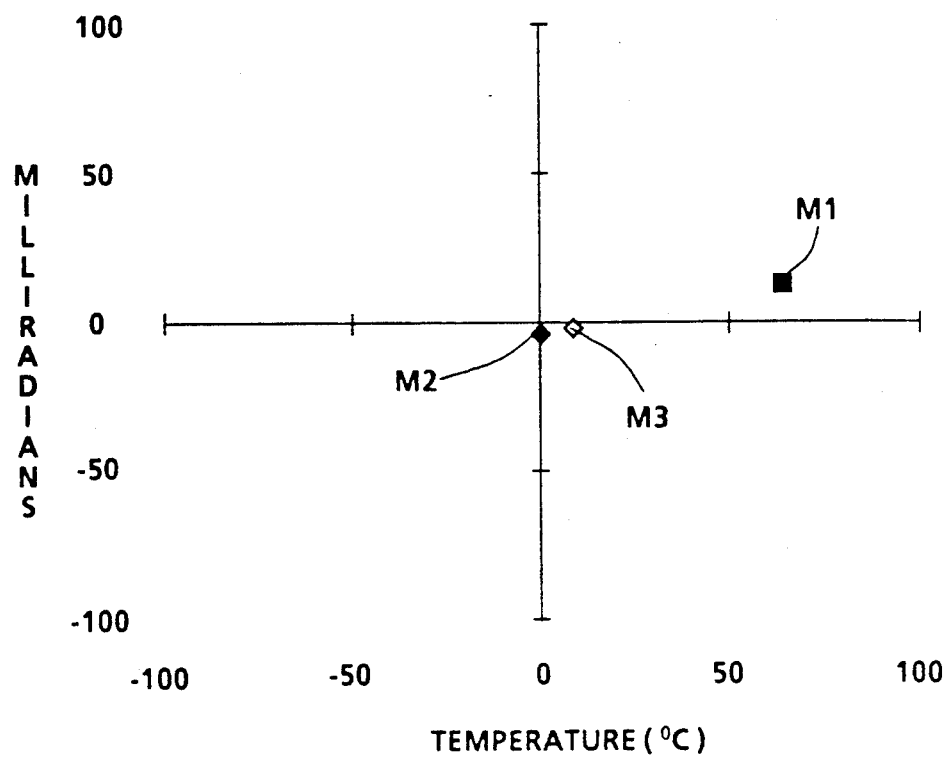
FIG. 4 is a plot of hysteresis thermal drift comparing prior art structures with the mounting structure of the present invention.

FIG. 4 shows a plot comparing normalized thermal hysteresis (in milliradions per °C.) of a steel prior art structure mirror M1 and two steel mirrors M2, M3 constructed according to the principles of the present invention. The three mirrors were subject to heating from room temperature up to 80° C., and then cooled again to the ambient. Mirror mount temperatures were sensed by a thermal couple bonded to the front side below the mirror. Mirror M2 exhibits almost no thermal hysteresis, mirror 3, a very small amount, and mirror 1, a significantly greater amount.

Figure 5:
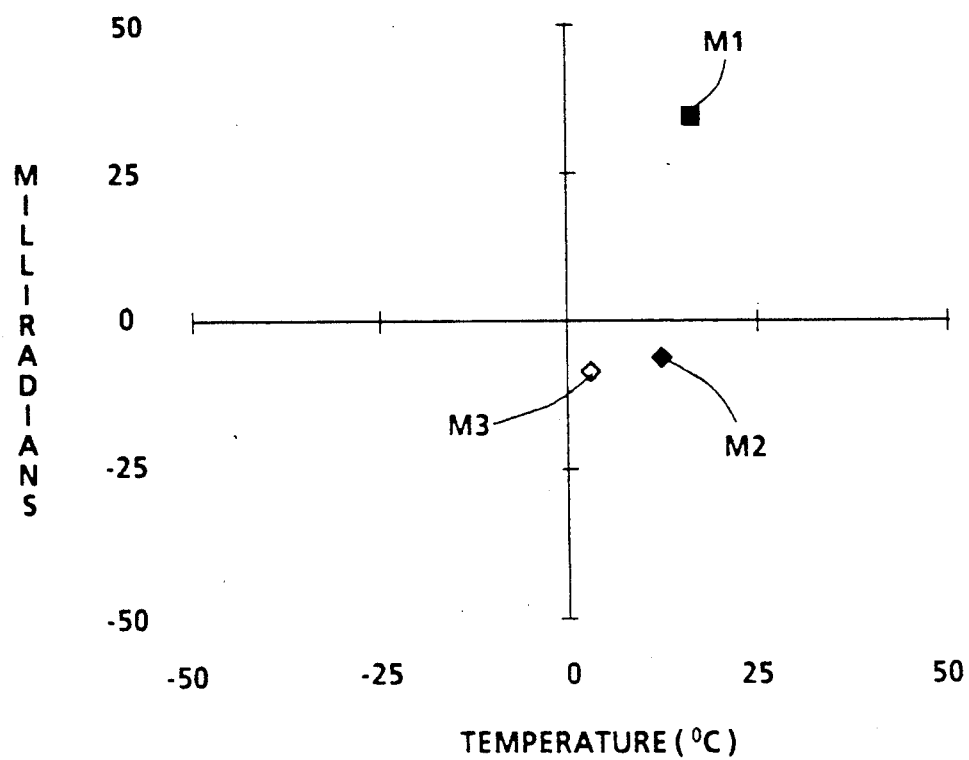
FIG. 5 is a plot of thermal drift during an operational cycle comparing a prior art structure with the mounting structure of the present invention.

FIG. 5 shows a second plot comparing normalized thermal drift in milliradions for each change in temperature of 1° C. This plot demonstrates the drift to be encountered during actual ROS operation during, for example, a rise in the ambient temperature. With each increase of 1° C., mirrors M2, M3 exhibit a thermal drift of only a few milliradians, while mirror M1 exhibits approximately 35 milliradians of change for the same temperature increase.

Although the invention has disclosed the application of the "push" forces to achieve the more critical vertical alignment of the mirror, the same principle can be used to accomplish horizontal alignment of the mirror.

While the invention has been described with reference to the structure disclosed, it is not confined to the specific details set forth, but is intended to cover such modifications or changes as may come within the scope of the following claims.

I claim:

1. A mirror mounting assembly for maintaining a mirror in a specified vertical alignment position including, in combination, an integral mounting structure having a base portion, a first relatively thick arm portion extending vertically upward from said base portion, a mirror mount portion adapted to hold a mirror in a fixed vertical position, said mirror mount portion integrally connected to said arm portion by a narrow, slightly flexible, neck portion extending generally in a horizontal direction from said arm portion, and biasing means secured and said arm portion and contacting the surface of said mirror mount portion at two or more points to apply an outward bias against the mirror mount portion, whereby said mirror is held in an accurate alignment during system thermal drift conditions.

2. The assembly of claim 1 wherein said arm portion has two threaded apertures extending therethrough in vertical alignment with each other, said biasing means comprising two screws adapted to be threaded through said apertures so as to contact the surface of said mirror mount portion at two or more vertically separated points, thereby applying a pushing force against said points.

3. In a laser printing system having means for generating a beam of high intensity light, a recording medium sensitive to said high intensity light, optical means comprising a plurality of optical elements including at least one mirror interposed between said light generating and said recording medium for imaging said beam to a spot at the surface of said medium, modulating means located between said light generating means and a scanner device for modulating the light beam in accordance with the information content of electrical signals, said scanner device comprising a multi-faceted polygon located in the path of said modulated beam between said beam generating means and said recording medium and having reflective facets for reflecting the beam incident thereon onto said medium, means for rotating said polygon such that the reflected light is scanned in successive traces across said medium, the improvement whereby at least one of said mirrors is located on a stable, thermal resistant mounting which includes in combination, an integral mounting structure having a base portion, a first relatively thick arm portion extending vertically upward from said base portion, a mirror mount portion adapted to hold a mirror in a fixed vertical position, said mirror portion integrally connected to said arm portion by a narrow, slightly flexible, neck portion extending generally in a horizontal direction from said arm portion, and biasing means secured in said arm portion and contacting the surface of said mirror mount portion at two or more points to apply an outward bias against the mirror mount portion, whereby said mirror is held in an accurate alignment during system thermal drift conditions.

* * * * *